(12) United States Patent
Ku et al.

(10) Patent No.: US 10,680,975 B2
(45) Date of Patent: Jun. 9, 2020

(54) METHOD OF DYNAMIC RESOURCE ALLOCATION FOR PUBLIC CLOUDS

(71) Applicant: Futurewei Technologies, Inc., Plano, TX (US)

(72) Inventors: Chi Young Ku, San Ramon, CA (US); DaQi Ren, Saratoga, CA (US)

(73) Assignee: Futurewei Technologies, Inc., Plano, TX (US)

( * ) Notice: Subject to any disclaimer, the term of this patent is extended or adjusted under 35 U.S.C. 154(b) by 590 days.

(21) Appl. No.: 15/383,751

(22) Filed: Dec. 19, 2016

(65) Prior Publication Data
US 2018/0176148 A1 Jun. 21, 2018

(51) Int. Cl.
*H04L 12/911* (2013.01)
*H04L 29/08* (2006.01)
(Continued)

(52) U.S. Cl.
CPC ....... *H04L 47/823* (2013.01); *G06Q 30/0283* (2013.01); *H04L 67/10* (2013.01); *H04L 67/22* (2013.01); *H04L 47/72* (2013.01); *H04L 47/788* (2013.01); *H04L 47/805* (2013.01); *H04L 47/822* (2013.01)

(58) Field of Classification Search
CPC ......... G06F 11/3006; G06F 2209/5019; G06F 11/3452; G06F 9/5083
See application file for complete search history.

(56) References Cited

U.S. PATENT DOCUMENTS

| 7,941,332 B2 * | 5/2011 | Liu | G06F 9/5083 705/7.11 |
| 9,015,227 B2 * | 4/2015 | Mazzucco | G06F 9/505 709/203 |

(Continued)

OTHER PUBLICATIONS

Chandra, Abhishek, et al., "Dynamic Resource Allocation for Shared Data Centers Using Online Measurements", Jeffay K., Stoica I., Wehrle K. (eds) Quality of Service—IWQoS 2003. IWQoS 2003. Lecture Notes in Computer Science, vol. 2707. Springer, Berlin, Heidelberg, (May 27, 2003), 381-398.

(Continued)

*Primary Examiner* — William G Trost, IV
*Assistant Examiner* — Imran Moorad
(74) *Attorney, Agent, or Firm* — Schwegman Lundberg & Woessner, P.A.

(57) ABSTRACT

A device comprises a memory storage comprising instructions and one or more processors in communication with the memory. The one or more processors execute the instructions to access data for a plurality of previous time periods for a client of a plurality of clients, the data for each previous time period of the plurality of previous time periods including resource usage data for a plurality of jobs of the client, apply a time series analysis algorithm to the accessed data to predict a distribution of characteristics of resource usage for a future time period for the client, based on the predicted distribution of characteristics of resource usage, simulate a number of future predicted workloads for the future time period for the client, and based on the simulated number of future predicted workloads, automatically reserve a set of resources for the future time period for the client.

19 Claims, 5 Drawing Sheets

(51) Int. Cl.
G06Q 30/02 (2012.01)
H04L 12/927 (2013.01)

(56) References Cited

U.S. PATENT DOCUMENTS

| | | | |
|---|---|---|---|
| 2006/0074970 A1* | 4/2006 | Narayanan | G06F 11/3419 |
| 2009/0276203 A1* | 11/2009 | Everhart | G06F 11/3457 |
| | | | 703/21 |
| 2011/0196908 A1* | 8/2011 | Sukthankar | G06N 3/126 |
| | | | 709/201 |
| 2012/0016721 A1* | 1/2012 | Weinman | G06Q 10/06 |
| | | | 705/7.35 |
| 2016/0253215 A1* | 9/2016 | Fang | H04L 67/1008 |
| | | | 718/104 |
| 2017/0147404 A1* | 5/2017 | Chen | G06F 9/5038 |
| 2017/0295224 A1* | 10/2017 | Tino | G06F 9/5077 |

OTHER PUBLICATIONS

Islam, Sadeka, et al., "Empirical prediction models for adaptive resource provisioning in the cloud", Future Generation Computer Systems 28 (2012) 155-162, (Jun. 25, 2011), 155-162.

Roy, Nilabja, et al., "Efficient Autoscaling in the Cloud using Predictive Models for Workload Forecasting", 2011 IEEE 4th International Conference on Cloud Computing, Jul. 4-9, 2011, (Jul. 4, 2011), 500-507.

* cited by examiner

400

USAGE DATA TABLE

| CLIENT | JOB | TIME | CPU | DISK | MEMORY | NETWORK |
|---|---|---|---|---|---|---|
| A | 1 | 12:21 | 5% | 1GB | 2GB | 1GB |
| A | 2 | 12:22 | 4% | .8GB | 2.4GB | 1.2GB |
| B | 3 | 12:27 | 40% | 1.1GB | 1.2GB | 0.7GB |
| B | 4 | 12:31 | 20% | 9GB | 8GB | 1.5GB |
| B | 5 | 1:20 | 9% | 3GB | 5GB | 5GB |
| C | 6 | 1:40 | 25% | 12GB | 7GB | 2GB |

410, 420, 430A, 430B, 430C, 430D, 430E, 430F

RESOURCE COST TABLE

| RESOURCE | TIME | FIXED COST | EXPECTED SPOT COST |
|---|---|---|---|
| CPU 1 | 12:00 | $0.005 | $0.006 |
| CPU 2 | 12:00 | $0.005 | $0.006 |
| 10GB DISK | 12:00 | $0.003 | $0.004 |
| 1GB RAM | 12:00 | $0.002 | $0.0015 |
| 100MB NET | 12:00 | $0.001 | $0.002 |

METHOD OF DYNAMIC RESOURCE ALLOCATION FOR PUBLIC CLOUDS

TECHNICAL FIELD

The present disclosure is related to resource allocation, and in particular to dynamic resource allocation for public clouds.

BACKGROUND

A public cloud provides computing resources (e.g., CPU time, memory storage, memory input/output (I/O), network access throughput) to one or more clients. The one or more clients reserve the computing resources either at a fixed contract price or by bidding for the computing resources on an as-needed basis at an auction price.

SUMMARY

A device includes a memory storage comprising instructions and one or more processors in communication with the memory. The one or more processors execute the instructions to perform accessing data for a plurality of previous time periods for a client of a plurality of clients, the data for each previous time period of the plurality of previous time periods including resource usage data for a plurality of jobs of the client, applying a time series analysis algorithm to the accessed data to predict a distribution of characteristics of resource usage for a future time period for the client, based on the predicted distribution of characteristics of resource usage for the future time period for the client, simulating a number of future predicted workloads for the future time period for the client, and based on the simulated number of future predicted workloads for the future time period for the client, automatically reserving a set of resources for the future time period for the client.

A computer-implemented method for requesting computing resources includes accessing, with one or more processors, data for a plurality of previous time periods for a client of a plurality of clients, the data for each previous time period of the plurality of previous time periods including resource usage data for a plurality of jobs of the client; applying, with the one or more processors, a time series analysis algorithm to the accessed data to predict a distribution of characteristics of resource usage for a future time period for the client; based on the predicted distribution of characteristics of resource usage for the future time period for the client, simulating, with the one or more processors, a number of future predicted workloads for the future time period for the client; and based on the simulated number of the future predicted workloads for the future time period for the client, automatically reserving, with the one or more processors, a set of resources for the future time period for the client.

A non-transitory computer-readable medium stores computer instructions for requesting computing resources, that when executed by one or more processors, cause the one or more processors to perform steps of: accessing data for a plurality of previous time periods for a client of a plurality of clients, the data for each previous time period of the plurality of previous time periods including resource usage data for a plurality of jobs of the client; applying a time series analysis algorithm to the accessed data to predict a distribution of characteristics of resource usage for a future time period for the client; based on the predicted distribution of characteristics of resource usage for the future time period for the client, simulating a number of future predicted workloads for the future time period for the client; and based on the simulated number of the future predicted workloads for the future time period for the client, automatically reserving a set of resources for the future time period for the client.

In example 1, a device comprises: a memory storage comprising instructions; and one or more processors in communication with the memory, wherein the one or more processors execute the instructions to perform: accessing data for a plurality of previous time periods for a client of a plurality of clients, the data for each previous time period of the plurality of previous time periods including resource usage data for a plurality of jobs of the client; applying a time series analysis algorithm to the accessed data to predict a distribution of characteristics of resource usage for a future time period for the client; based on the predicted distribution of characteristics of resource usage for the future time period for the client, simulating a number of future predicted workloads for the future time period for the client; and based on the simulated number of future predicted workloads for the future time period for the client, automatically reserving a set of resources for the future time period for the client.

Example 2 includes the device of example 1, wherein the time series analysis algorithm is a vector auto-regression.

Example 3 includes the device of example 1 or example 2, wherein the number of future predicted workloads for the future time period for the client is at least one thousand future predicted workloads for the future time period.

Example 4 includes the device of example 1 to example 3, wherein the one or more processors further perform: determining a target quality of service for the future time period for the client; and identifying a set of resources to achieve the target quality of service for a predetermined percentage of the simulated number of future predicted workloads; and wherein the automatically reserving the set of resources for the future time period comprises reserving the identified set of resources.

Example 5 includes the device of example 1 to example 4, wherein: the jobs performed for the client are performed for a user of the client; and the target quality of service for the client is based on the user of the client.

Example 6 includes the device of example 1 to example 5, wherein the one or more processors further perform: accessing a fixed price cost for reserving the set of resources for the future time period; and accessing a spot price cost for reserving the set of resources for the future time period; and wherein the automatically reserving the set of resources for the future time period comprises reserving the set of resources using a lower cost of the fixed price cost and the spot price cost.

Example 7 includes the device of example 1 to example 6, wherein the resource usage data for the plurality of jobs of the client comprises central processing unit (CPU) usage, memory input/output (I/O) usage, disk I/O usage, and network usage.

Example 8 includes the device of example 1 to example 7, wherein the one or more processors further perform: accessing second data for the plurality of previous time periods for a second client of the plurality of clients, the second data for each previous time period of the plurality of previous time periods including resource usage data for a plurality of jobs of the second client; applying a time series analysis algorithm to the accessed second data to predict a distribution of characteristics of resource usage for the future time period for the second client; based on the predicted distribution of characteristics of resource usage for the future time period for the second client, simulating a number of future predicted workloads for the future time period for the second client; and based on the simulated number of the future predicted workloads for the future time period for the second client, automatically reserving a second set of resources for the future time period for the second client.

Example 9 includes the device of example 1 to example 8, wherein: the automatically reserving of the set of resources for the future time period for the client is further based on the simulated number of the future predicted workloads for the future time period for the second client; and the automatically reserving of the second set of resources for the future time period for the second client is further based on the simulated number of the future predicted workloads for the future time period for the client.

Example 10 includes the device of example 1 to example 9, wherein: the simulating of each predicted workload of the future predicted workloads for the future time period for the client includes: drawing jobs for the future time period for the client according to an arrival rate; and for each resource and each job, drawing the resource for the job based on a mean and a variance for the resource determined from the data for the plurality of previous time periods for the plurality of jobs of the client.

In example 11, a computer-implemented method for requesting computing resources comprises: accessing, with one or more processors, data for a plurality of previous time periods for a client of a plurality of clients, the data for each previous time period of the plurality of previous time periods including resource usage data for a plurality of jobs of the client; applying, with the one or more processors, a time series analysis algorithm to the accessed data to predict a distribution of characteristics of resource usage for a future time period for the client; based on the predicted distribution of characteristics of resource usage for the future time period for the client, simulating, with the one or more processors, a number of future predicted workloads for the future time period for the client; and based on the simulated number of the future predicted workloads for the future time period for the client, automatically reserving, with the one or more processors, a set of resources for the future time period for the client.

Example 12 includes the computer-implemented method of example 11, wherein the time series analysis algorithm is a vector auto-regression.

Example 13 includes the computer-implemented method of example 11 or example 12, wherein the number of future predicted workloads for the future time period for the client is at least one thousand future predicted workloads for the future time period.

Example 14 includes the computer-implemented method of example 11 to example 13, further comprising: determining a target quality of service for the future time period for the client; and identifying a set of resources to achieve the target quality of service for a predetermined percentage of the simulated number of future predicted workloads; and wherein the automatically reserving the set of resources for the future time period comprises reserving the identified set of resources.

Example 15 includes the computer-implemented method of example 11 to example 14, wherein: the jobs performed for the client are performed for a user of the client; and the target quality of service for the client is based on the user of the client.

Example 16 includes the computer-implemented method of example 11 to example 15, further comprising: accessing a fixed price cost for reserving the set of resources for the future time period; and accessing a spot price cost for reserving the set of resources for the future time period; and wherein the automatically reserving the set of resources for the future time period comprises reserving the set of resources using a lower cost of the fixed price cost and the spot price cost.

Example 17 includes the computer-implemented method of example 11 to example 16, wherein the resource usage data for the plurality of jobs of the client comprises CPU usage, memory input/output (I/O) usage, disk I/O usage, and network usage.

Example 18 includes the computer-implemented method of example 11 to example 17, further comprising: accessing second data for the plurality of previous time periods for a second client of the plurality of clients, the second data for each previous time period of the plurality of previous time periods including resource usage data for a plurality of jobs of the second client; applying a time series analysis algorithm to the accessed second data to predict a distribution of characteristics of resource usage for the future time period for the second client; based on the predicted distribution of characteristics of resource usage for the future time period for the second client, simulating a number of future predicted workloads for the future time period for the second client; and based on the simulated number of the future predicted workloads for the future time period for the second client, automatically reserving a second set of resources for the future time period for the second client.

Example 19 includes the computer-implemented method of example 11 to example 18, wherein: the automatically reserving of the set of resources for the future time period for the client is further based on the simulated number of the future predicted workloads for the future time period for the second client; and the automatically reserving of the second set of resources for the future time period for the second client is further based on the simulated number of the future predicted workloads for the future time period for the client.

In example 20, a non-transitory computer-readable medium stores computer instructions for requesting computing resources, that when executed by one or more processors, cause the one or more processors to perform steps of: accessing data for a plurality of previous time periods for a client of a plurality of clients, the data for each previous time period of the plurality of previous time periods including resource usage data for a plurality of jobs of the client; applying a time series analysis algorithm to the accessed data to predict a distribution of characteristics of resource usage for a future time period for the client; based on the predicted distribution of characteristics of resource usage for the future time period for the client, simulating a number of future predicted workloads for the future time period for the client; and based on the simulated number of the future predicted workloads for the future time period for the client, automatically reserving a set of resources for the future time period for the client.

BRIEF DESCRIPTION OF THE DRAWINGS

FIG. 4 is a block diagram illustration of a database schema for use in a method of allocating resources for one or more clients, according to some example embodiments.

DETAILED DESCRIPTION

In the following description, reference is made to the accompanying drawings that form a part hereof, and in which are shown by way of illustration specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a digital signal processor, application-specific integrated circuit (ASIC), programmable data plane chip, field-programmable gate array (FPGA), microprocessor, or other type of processor operating on a computer system, such as a switch, server, or other computer system, turning such a computer system into a specifically programmed machine.

A public cloud is based on the cloud computing model, in which a service provider makes resources, such as applications and storage, available to multiple clients over a network (e.g., the Internet). A method of dynamic resource allocation for public clouds performs a regression analysis on resources consumed by a client in prior time periods. Based on the regression analysis, a plurality of possible workloads for the client in a future time period are created. Based on the plurality of possible workloads and a predetermined threshold probability of meeting a target quality of service, resources to be reserved for the future time period are identified. The identified resources may be automatically reserved in advance, may be bid for on a spot market at the time of use, or may be partially reserved and partially bid on.

A workload for a client for a period of time is the number and distribution of jobs for the client in the period of time. Quality of service refers to a certain percentage of jobs completing within a predetermined period of time. For example, if the predetermined period of time is one second, a 95% quality of service is achieved when at least 95% of jobs complete within one second.

Figure 1:
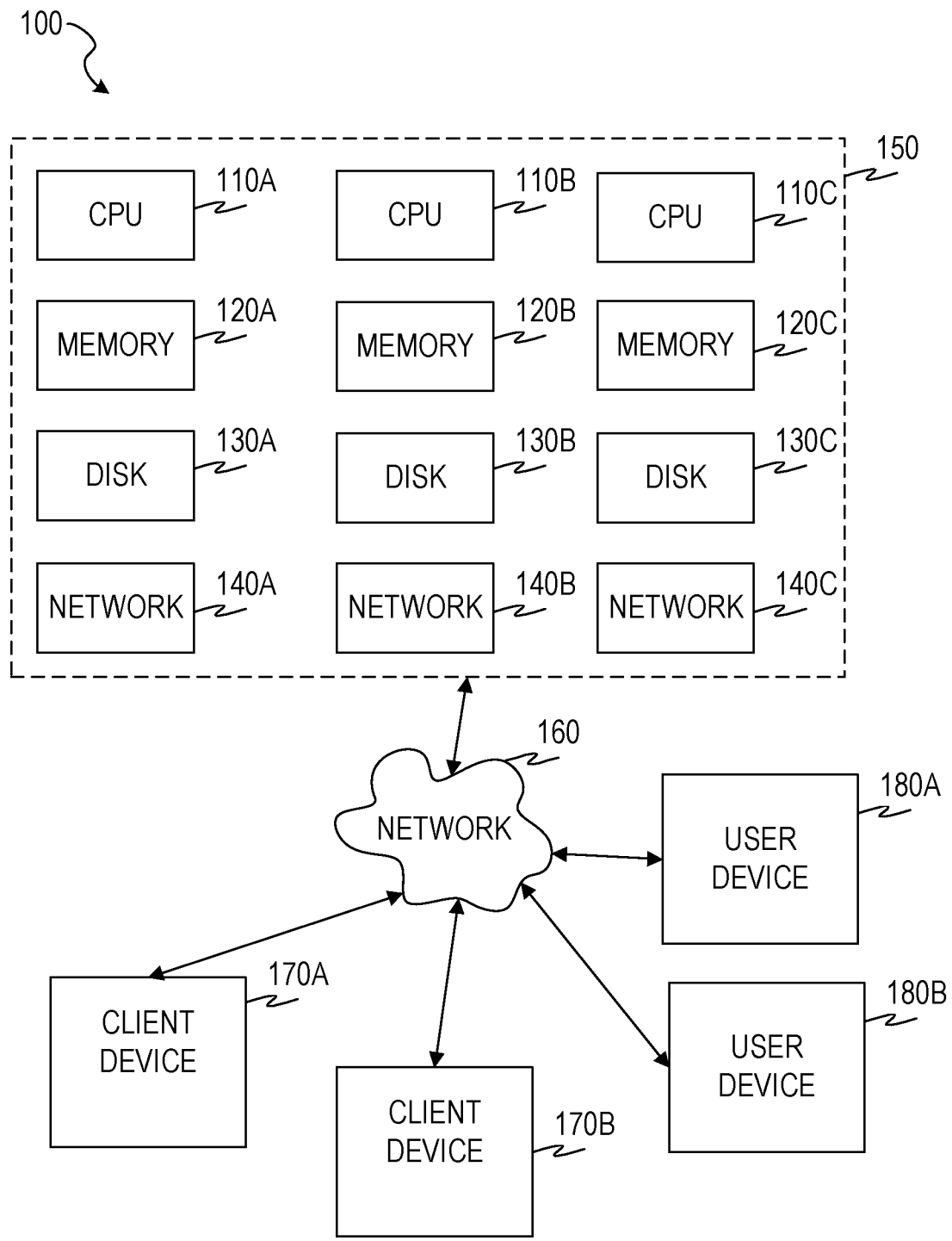
FIG. 1 is a block diagram illustration of a computing service provider in network communication with clients and users, according to some example embodiments.

FIG. 1 is a block diagram illustration 100 of a computing service provider in network communication with clients and users, according to some example embodiments. FIG. 1 shows a set of CPUs 110A, 110B, and 110C, memories 120A, 120B, and 120C, hard disk drives 130A, 130B, and 130C, and network connections 140A, 140B, and 140C, grouped together as a set of computing resources 150 (e.g., a set of cloud-based resources in a public cloud). The set of computing resources 150 may be under the control of a computing service provider for the benefit of third-party clients and used either by the clients themselves or by users of services provided by the clients. For example, a web hosting service may provide the set of computing resources 150 to a client that uses a subset of the computing resources to provide a web application to end users. In FIG. 1, the set of computing resources 150 is connected via a network 160 (e.g., the Internet) to client devices 170A-170B and user devices 180A-180B.

The CPUs 110A-110C, memories 120A-120C, hard disk drives 130A-130C, and network connections 140A-140C may form one or more computer systems, as described below with respect to FIG. 5. The client devices 170A-170B and user devices 180A-180B may also be implemented as computer systems, as described with respect to FIG. 5. Any of the machines or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 5. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The set of computing resources 150, the client devices 170A-170B, and the user devices 180A-180B may be connected by the network 160. The network 160 may be any network that enables communication between or among machines, databases, and devices. Accordingly, the network 160 may be a wired network, a wireless network (e.g., a mobile or cellular network), or any suitable combination thereof. The network 160 may include one or more portions that constitute a private network, a public network (e.g., the Internet), or any suitable combination thereof.

Figure 2:
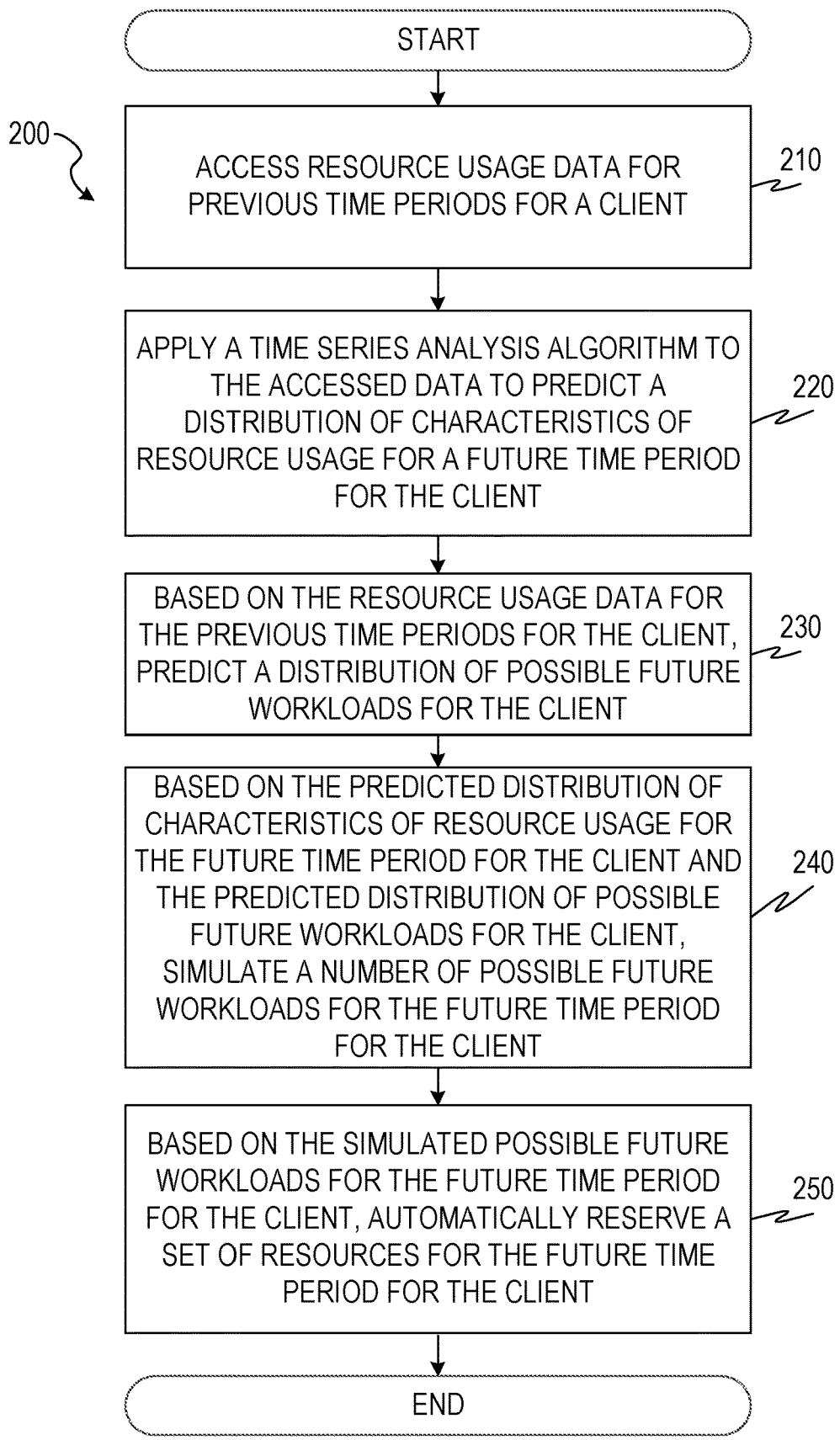
FIG. 2 is a flowchart illustration of a method of allocating resources for a client, according to some example embodiments.

FIG. 2 is a flowchart illustration of a method 200 of allocating resources for a client, according to some example embodiments. The method 200 includes operations 210-250. By way of example and not limitation, the method 200 is described as being performed by a client device 170A implemented as the computer system of FIG. 5.

In operation 210, the processing unit 505 accesses resource usage data for previous time periods for a client from a database stored in the non-removable storage 535. The resource usage data may be stored in the usage data table 410 of FIG. 4.

The processing unit 505 applies a time series analysis algorithm to the accessed data to predict a distribution of characteristics of resource usage for a future time period for the client (operation 220). For example, vector auto regression may be used to estimate the interdependencies among the variables (e.g., number of simultaneous jobs, time of day, day of week, day of month, season, number of total jobs, CPU consumption, disk input/output (I/O), memory I/O, network usage, or any combination thereof).

Vector auto regression of degree p is a statistical model that assumes:

$$Y(t+1) = C0 + C1 \times Y(t) + \ldots + Cn \times Y(t-p) + e(t+1)$$

where Y(t) is a column of n random variables for time t, e(t) is a column of normal random variables for time t, C0 to Cn are columns of constants, and p is the degree of the vector auto regression model.

In operation 230, the processing unit 505 predicts a distribution of possible future workloads for the client in the future time period based on the resource usage data for the previous time periods for the client. The generated distribution of possible future workloads for the future time period for the client may be based on variables that are the same as or different from those used in operation 220 (e.g., mean and variance of the number of simultaneous jobs and the number of total jobs for the client in the previous time periods, time data for the previous time periods showing periodic, cyclical, or trending usage, or any combination thereof). In some example embodiments, a Kalman filter is used to predict the distribution of workloads. A Kalman filter for a vector auto regression model of degree p is an algorithm that computes the distribution of random variables for a vector of processes at time t+1 based on the realization of the processes for the last p time periods (e.g., the last 5 time periods).

The processing unit 505 simulates a number of future predicted workloads for the future time period for the client based on the predicted distribution of possible future workloads and the predicted distribution of characteristics of resource usage (operation 240). For example, one thousand future predicted workloads may be generated based on the predicted distribution of workloads (e.g., one thousand predicted workloads having the same mean and variance as the predicted distribution). Each of the one thousand future predicted workloads may be fed into the results of the vector auto regression, generating expected resource consumption for each of the one thousand future predicted workloads. Thus, a distribution of resource consumption for the future time period for the client is generated. The example pseudo-code for operation 240, below, may be used. The example pseudo-code is presented by way of example and not limitation, and may not include all details.

```
determineResourcesForSimulations( ) {
// iterate over the desired number of simulations, e.g., 1000
for (i = 0; i < NUM_SIMULATIONS; i++) {
    // arrivalRate indicates the number of jobs expected to arrive in the time
    // period
    // normalizedRand( ) is a function that generates a random offset within a
    // normal distribution, given the variance of the distribution
    arrivalRate = jobArrivalRateMean +
                    normalizedRand(jobArrivalRateVariance);
    // iterate over the future time period
    job = 0;
    arrivalTime[i][job] = 0;
    while (arrivalTime[i][job] < PERIOD_LENGTH) {
        // set the resource usage for the job
        cpuUsed[i][job] = cpuUsageMean +
                    normalizedRand(cpuUsageVariance);
        diskUsed[i][job] = diskUsageMean +
                    normalizedRand(diskUsageVariance);
        networkUsed[i][job] = networkUsageMean +
                    normalizedRand(networkUsageVariance) ;
        memoryUsed[i][job] = memoryUsageMean +
                    normalizedRand(memoryUsageVariance);
        // set the start time for the next job
        job++;
        arrivalTime[job] = arrivalTime[job-1] + JobArrivalRateMean
                    + normalizedRand(jobArrivalRateVariance);
    }
    // cpuUsed, diskUsed, networkUsed, memoryUsed now indicate the amount
    // of each resource used in each job
    lastJob = job;
    // given the jobs and their resource consumption, determine the resources
    // needed to meet the target quality of service
    // iterate, adjusting the allocated resources, until the target quality of service
    // is reached
    firstIteration = TRUE;
    do {
        if(firstIteration) {
            // initialize the allocated resources
            cpuAlloc = DEFAULT_CPU_ALLOC;
            diskAlloc = DEFAULT_DISK_ALLOC;
            memoryAlloc = DEFAULT_MEMORY_ALLOC;
            networkAlloc = DEFAULT_NETWORK_ALLOC;
            firstIteration = FALSE;
        } else {
            if (qos > TARGET_QOS) {
                // reduce resource allocation
                // identify job with least wait time
                leastWaitJob = findLeastWaitJob( );
                leastWaitTime = findLeastWaitTime(leastWaitJob);
                // decrement the resources with minimum wait
                if (cpuWait[leastWaitJob] == leastWaitTime)
                    cpuAlloc--;
```

```
                if( diskWait[leastWaitJob] == leastWaitTime)
                    diskAlloc--;
                if( networkWait[leastWaitJob] == leastWaitTime)
                    networkAlloc--;
                if( memoryWait[leastWaitJob] == leastWaitTime)
                    memoryAlloc--;
            } else {
                // increase resource allocation
                // identify job with greatest wait time
                    greatestWaitJob = findGreatestWaitJob( );
                    greatestWaitTime = findGreatestWaitTime(greatestWaitJob);
                // increment the resources causing the wait
                if(cpuWait[greatestWaitJob] == greatestWaitTime)
                    cpuAlloc++;
                if( diskWait[greatestWaitJob] == greatestWaitTime)
                    diskAlloc++;
                if( networkWait[greatestWaitJob] == greatestWaitTime)
                    networkAlloc++;
                if( memoryWait[greatestWaitJob] == greatestWaitTime)
                    memoryAlloc++;
            }
        }
        // determine the wait time for each resource for each job
        // initialize the availability time of each resource
        cpuAvail = diskAvail = networkAvail = memoryAvail = 0;
        // initialize the count of jobs meeting and failing the QoS target
        goodJobs = badJobs = 0;
        for (job = 0; job < lastJob; job++) {
            if (cpuAvail > arrivalTime[job]) {
                cpuWait[job] = cpuAvail - arrivalTime[job];
                cpuAvail += cpuUsed[i][job] / cpuAlloc;
            } else {
                cpuWait[job] = 0;
                cpuAvail = arrivalTime[job] + cpuUsed[i][job] / cpuAlloc;
            }
            if (diskAvail > arrivalTime[job]) {
                diskWait[job] = diskAvail - arrivalTime[job];
                diskAvail += diskUsed[i][job] / diskAlloc;
            } else {
                diskWait[job] = 0;
                diskAvail = arrivalTime[job] + diskUsed[i][job] / diskAlloc;
            }
            if (networkAvail > arrivalTime[job]) {
                networkWait[job] = networkAvail - arrivalTime[job];
                networkAvail += networkUsed[i][job] / networkAlloc;
            } else {
                networkWait[job] = 0;
                networkAvail = arrivalTime[job] +
                    networkUsed[i][job] / networkAlloc;
            }
            if (memoryAvail > arrivalTime[job]) {
                memoryWait[job] = memoryAvail - arrivalTime[job];
                memoryAvail += memoryUsed[i][job] / memoryAlloc;
            } else {
                memoryWait[job] = 0;
                memoryAvail = arrivalTime[job] +
                    memoryUsed[i][job] /memoryAlloc;
            }
            if(cpuWait[job] < MAX_WAIT && diskWait[job] < MAX_WAIT
                    && networkWait[job] < MAX_WAIT
                    && memoryWait[job] < MAX_WAIT)
                goodJobs++;
            else
                badJobs++;
        }
        qos = goodJobs / lastJob;
    } until (ABS(TARGET_QOS - qos) < QOS_THRESHOLD)
    }
}
```

In operation 250, the processing unit 505 reserves a set of resources for the future time period for the client, based on the simulated possible future workloads for the future time period for the client. For example, resources consumed by each simulation to meet a target quality of service may be identified. Minimum resources sufficient to meet the target quality of service for 60 percent of the simulations may be identified and resources sufficient to satisfy those demands may be reserved. In various example embodiments, different thresholds are used (e.g., 60%, 50%, 95%, or 100%). The example pseudo-code for operation 250, below, may be used.

```
        determineResourcesToReserve( ) {
// this function identifies the resources to reserve, given the results of the
// simulations from determineResourcesForSimulations( )
// sort is a function that sorts an array of numbers in ascending order
sort(cpuUsed);
// identify the target percentile of resource consumption in the simula-
tions
// TARGET_PERCENT is expressed as a fraction (e.g., 0.6 for 60%)
cpuToReserve = cpuUsed[TARGET_PERCENT *
NUM_SIMULATIONS];
sort(diskUsed);
diskToReserve = diskUsed[TARGET_PERCENT *
NUM_SIMULATIONS];
sort(networkUsed);
networkToReserve = networkUsed[TARGET_PERCENT *
        NUM_SIMULATIONS];
sort(memoryUsed);
memoryToReserve = memoryUsed[TARGET_PERCENT *
        NUM_SIMULATIONS];
}
```

The reservation of resources may be further based on the reservation and spot prices of the resources. For example, referring to the resource cost table 440 of FIG. 4, the fixed cost to reserve a CPU may be $0.005 per hour and the expected spot cost for the same CPU may be $0.006 per hour. To minimize costs, the CPU may be reserved at the lower price. As another example, the fixed cost for RAM I/O may be 33% higher than the expected spot price for RAM I/O. Accordingly, some clients will prefer to forego reservation of the RAM I/O and instead purchase the use of the RAM I/O on the spot market. Other clients will prefer to avoid the risk that the expected spot price will change, and will instead reserve resources even when the expected spot price is lower.

The target quality of service may be based on the users of the client's services. For example, the client may have a first user that uses the client's services for business purposes during business hours. The first user's business depends on responsive service by the client. Accordingly, the client agrees with the first user to complete at least 95% of jobs within one second, with a financial penalty to be paid by the client if the quality of service target is not met. The client may have a second user that uses the client's services for batch processing during off-peak hours. The client agrees with the second user to complete at least 90% of jobs within five seconds, with a failure to meet the target quality of service remedied through provision of additional computing resources at a later date. Based on these agreements, the client may choose to use the $70^{th}$ percentile of simulations for time periods used by the first client and the $50^{th}$ percentile of simulations for time periods used by the second client.

Figure 3:
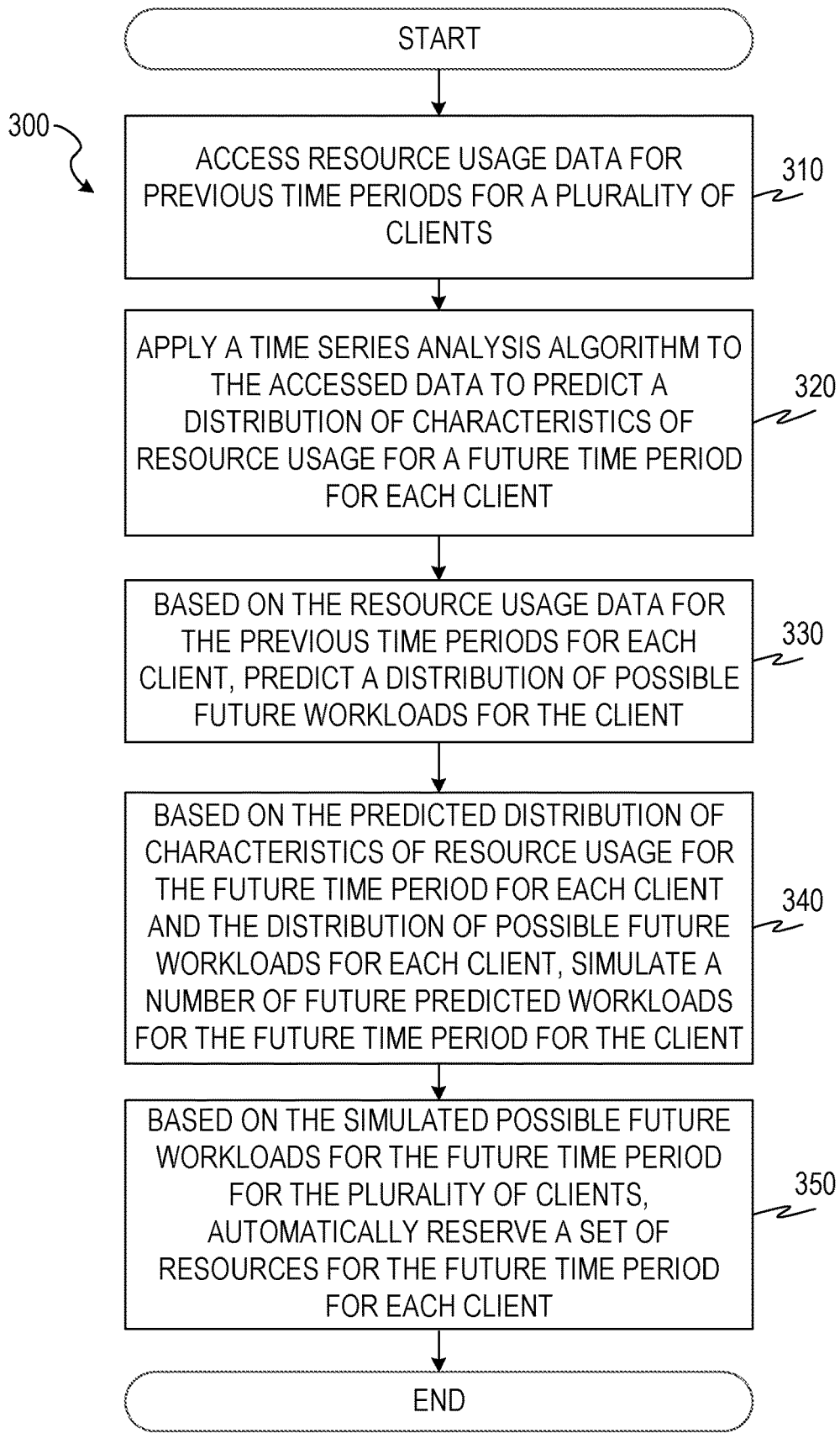
FIG. 3 is a flowchart illustration of a method of allocating resources for multiple clients, according to some example embodiments.

FIG. 3 is a flowchart illustration of a method 300 of allocating resources for multiple clients, according to some example embodiments. The method 300 includes operations 310-350. By way of example and not limitation, the method 300 is described as being performed by a server device that allocates the set of resources 150 (e.g., a server device that is implemented as the computer system of FIG. 5).

In operation 310, the processing unit 505 accesses resource usage data for previous time periods for a plurality of clients from a database stored in the non-removable storage 535. The resource usage data may be stored in the usage data table 410 of FIG. 4.

The processing unit 505 applies a time series analysis algorithm to the accessed data to predict a distribution of characteristics of resource usage for a future time period for each client (operation 320). For example, vector auto regression may be used to estimate the inter-dependencies among the variables.

In operation 330, the processing unit 505 predicts a distribution of possible future workloads for each client in the future time period based on the resource usage data for the previous time periods for the client. The generated distribution of possible workloads for the future time period for each client may be based on variables that are the same as or different from those used in operation 320. In some example embodiments, a Kalman filter is used to predict the distribution of workloads for each client.

The processing unit 505 simulates a number of future predicted workloads for the future time period for each client based on the predicted distribution of possible future workloads and the predicted distribution of characteristics of resource usage (operation 340). For example, one thousand future predicted workloads may be generated based on the predicted distribution of workloads by a Kalman filter (e.g., one thousand predicted workloads having the same mean and variance as the predicted distribution). Characteristics of each workload (e.g., number of jobs, time of arrival of each job, parameters for jobs, or any suitable combination thereof) in the one thousand future predicted workloads may be unique. Each of the one thousand future predicted workloads may be fed into the results of the vector auto regression, generating expected resource consumption for each of the one thousand future predicted workloads. Thus, a distribution of resource consumption for the future time period for each client is generated.

In operation 350, the processing unit 505 reserves a set of resources for the future time period for each client, based on the simulated possible future workloads for the future time period for the plurality of clients. For example, resources consumed by each simulation to meet a target quality of service for the corresponding client may be identified. Minimum resources sufficient to meet the target quality of service for 60 percent of the simulations for each client may be identified and resources sufficient to satisfy those demands may be reserved for the client. In various example embodiments, different thresholds are used (e.g., 60%, 50%, 95%, or 100%).

In some instances, the total identified resources to be reserved for the plurality of clients exceed the available resources. In those instances, the available resources may be divided between or among the plurality of clients. For example, the resources identified in operation 350 may be proportionally scaled down to the level of available resources. To illustrate, if operation 350 determines that 500 GB of disk space (or I/O) should be reserved for a first client and 800 GB of disk space (or I/O) should be reserved for a second client but only 1000 GB of disk space (or I/O) are available, 385 GB may be reserved for the first client ($5/13$ of 1000 GB) and 615 GB may be reserved for the second client ($8/13$ of 1000 GB). As another example, operation 350 may be repeated with a lower performance threshold. To illustrate, if operation 350 determines that disk space (or I/O) sufficient to ensure a 60% probability of a 95% quality of service for both the first client and the second client exceeds the available disk space, the probability may be reduced to 50% and operation 350 repeated. This process may be iterated, with successively lower probabilities of the target quality of service, until the resources determined in operation 350 are within the available resources.

In some instances, the total identified resources to be reserved for the plurality of clients are less than the available resources. In those instances, the excess available resources may be divided between or among the plurality of clients. For example, the resources identified in operation 350 may be proportionally scaled up to the level of available resources. To illustrate, if operation 350 determines that 500 GB of disk space (or I/O) should be reserved for a first client and 300 GB of disk space (or I/O) should be reserved for a second client but 1000 GB of disk space (or I/O) are available, 625 GB may be reserved for the first client (⅝ of 1000 GB) and 375 GB may be reserved for the second client (⅜ of 1000 GB). In this way, the probability of meeting the target quality of service for each client of the plurality of clients may be improved without reducing the probability of meeting the target quality of service for any client below the threshold used in operation 350.

In some example embodiments, the difference between the resources identified in operation 350 and the available resources may be handled using a social welfare mechanism. For example, certain resources may be allocated to each client initially, with other resources retained by the system for dynamic allocation. In this way, a minimum baseline level of service is assured for each client, while non-synchronized excess demands by any client can be accommodated. The division of resources may be determined based on a minimization of a global discontent function. The global discontent is the sum of the discontents for each client. The discontent for a client is the expected total wait time for all jobs for the client that exceeds the target maximum wait time for the jobs. For example, if the target quality of service for a client is to have 95% of jobs complete within the maximum wait time of one second, the portion of the wait time for each job that exceeds one second is summed and used as the discontent for the client. Thus, while increasing allocated resources for a first client at the expense of resources allocated for a second client reduces the discontent for the first client, it may simultaneously increase the discontent for the second client. Balancing these effects can result in efficient allocation of resources.

FIG. 4 is a block diagram illustration of a database schema 400 for use in a method of allocating resources for one or more clients, according to some example embodiments. The database schema 400 includes a usage data table 410 and a resource cost table 440.

The usage data table 410 uses a schema 420, such that each row in the usage data table 410 includes a client identifier, a job identifier, a timestamp, a CPU usage of the job, a disk I/O usage of the job, a memory I/O usage of the job, and a network usage of the job. The usage data table 410 includes one row 430A, 430B, 430C, 430D, 430E, and 430F for each job performed by the set of computing resources 150. The client identifier identifies the client for which the job was performed. The job identifier identifies the individual job. The timestamp identifies the time at which the job was begun or completed. In some example embodiments, two timestamps are stored, one to indicate the beginning of the job and one to indicate the time of completion. The CPU usage of the job indicates the amount of processing power used to complete the job. The CPU usage may be indicated as a percentage (e.g., average percentage of CPU cycles consumed during the time the job was running), a number of clock cycles, a time of active processing, or any suitable combination thereof. The disk I/O usage of the job indicates the total amount of data read and written by the job from and to the disk, the amount of time spent reading and writing data from and to the disk by the job, or any suitable combination thereof. The memory I/O usage of the job indicates the total amount of data read and written by the job from and to memory, the amount of time spent reading and writing data from and to memory by the job, or any suitable combination thereof. The network usage of the job indicates the total amount of data written to the network by the job, the total amount of data read from the network by the job, the sum of the amounts of data sent and received over the network by the job, or any suitable combination thereof.

The resource cost table 440 uses a schema 450, such that each row in the resource cost table 440 includes a resource identifier, a time for use of the resource (e.g., a predetermined block of time beginning at the indicated time or a time range), a fixed cost to reserve the resource for use during the indicated time period, and an expected spot cost to buy access to the resource for immediate use during the time period. The resource cost table 440 includes one row 460A, 460B, 460C, 460D, and 460E for each time period for each resource.

Figure 5:
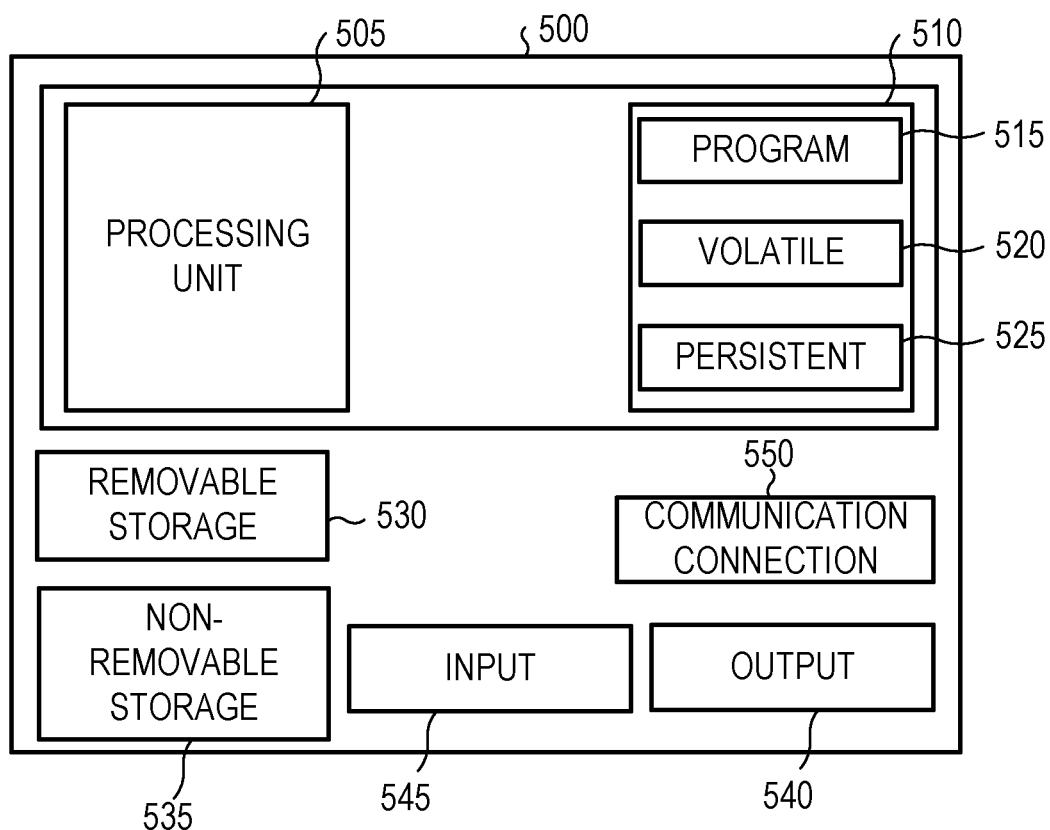
FIG. 5 is a block diagram illustrating circuitry for clients and servers that implement algorithms and perform methods, according to some example embodiments.

FIG. 5 is a block diagram illustrating circuitry for implementing algorithms and performing methods, according to example embodiments. All components need not be used in various embodiments. For example, the clients, servers, and cloud-based network resources may each use a different set of components, or in the case of servers for example, larger storage devices.

One example computing device in the form of a computer 500 (also referred to as computing device 500 and computer system 500) may include a processing unit 505, memory 510, removable storage 530, and non-removable storage 535. Although the example computing device is illustrated and described as the computer 500, the computing device may be in different forms in different embodiments. For example, the computing device may instead be a smartphone, a tablet, a smartwatch, or another computing device including elements the same as or similar to those illustrated and described with regard to FIG. 5. Devices, such as smartphones, tablets, and smartwatches, are generally collectively referred to as "mobile devices" or "user equipment". Further, although the various data storage elements are illustrated as part of the computer 500, the storage may also or alternatively include cloud-based storage accessible via a network, such as the Internet, or server-based storage.

The memory 510 may include volatile memory 520 and persistent memory 525, and may store a program 515. The computer 500 may include—or have access to a computing environment that includes—a variety of computer-readable media, such as the volatile memory 520, the persistent memory 525, the removable storage 530, and the non-removable storage 535. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

The computer 500 may include or have access to a computing environment that includes input 545, output 540, and a communication connection 550. The output 540 may include a display device, such as a touchscreen, that also may serve as an input device. The input 545 may include one or more of a touchscreen, a touchpad, a mouse, a keyboard, a camera, one or more device-specific buttons, one or more sensors integrated within or coupled via wired or wireless data connections to the computer 500, and other input devices. The computer 500 may operate in a networked environment using the communication connection 550 to connect to one or more remote computers, such as database servers. The remote computer may include a personal computer (PC), server, router, network PC, peer device or other common network node, or the like. The communication connection 550 may include a Local Area Network (LAN), a Wide Area Network (WAN), a cellular network, a WiFi network, a Bluetooth network, or other networks.

Computer-readable instructions stored on a computer-readable medium (e.g., the program 515 stored in the memory 510) are executable by the processing unit 505 of the computer 500. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

Devices and methods disclosed herein may reduce time, processor cycles, and power consumed in allocating resources to clients. Devices and methods disclosed herein may also result in improved allocation of resources to clients, resulting in improved throughput and quality of service.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A device comprising:
a memory storage comprising instructions; and
one or more processors in communication with the memory, wherein the one or more processors execute the instructions to perform:
accessing data for a plurality of previous time periods for a client of a plurality of clients, the data for each previous time period of the plurality of previous time periods including resource usage data for a plurality of jobs of the client;
applying a time series analysis algorithm to the accessed data to predict a distribution of characteristics of resource usage for a future time period for the client;
based on the predicted distribution of characteristics of resource usage for the future time period for the client, simulating a number of future predicted workloads for the future time period for the client, the simulating comprising:
generating a number of jobs expected to arrive in the future time period by selecting the number of jobs expected to arrive in the future time period from a normal distribution centered on a mean arrival rate; and
generating simulated jobs for the future time period for the client based on the number of jobs expected to arrive in the future time period; and
based on the simulated number of future predicted workloads for the future time period for the client, automatically reserving a set of resources for the future time period for the client.

2. The device of claim 1, wherein the time series analysis algorithm is a vector auto-regression.

3. The device of claim 1, wherein the number of future predicted workloads for the future time period for the client is at least one thousand future predicted workloads for the future time period.

4. The device of claim 1, wherein the one or more processors further perform:
determining a target quality of service for the future time period for the client; and
identifying the set of resources based on the target quality of service and a predetermined percentage of the simulated number of future predicted workloads.

5. The device of claim 4, wherein:
the jobs performed for the client are performed for a user of the client; and
the target quality of service for the client is based on the user of the client.

6. The device of claim 1, wherein the one or more processors further perform:
accessing a fixed price cost for reserving the set of resources for the future time period; and
accessing a spot price cost for reserving the set of resources for the future time period; and
wherein the automatically reserving the set of resources for the future time period comprises reserving the set of resources using a lower cost of the fixed price cost and the spot price cost.

7. The device of claim 1, wherein the resource usage data for the plurality of jobs of the client comprises CPU usage, memory input/output (I/O) usage, disk I/O usage, and network usage.

8. The device of claim 1, wherein the one or more processors further perform:
accessing second data for the plurality of previous time periods for a second client of the plurality of clients, the second data for each previous time period of the plurality of previous time periods including resource usage data for a second plurality of jobs of the second client;
applying the time series analysis algorithm to the accessed second data to predict a second distribution of characteristics of resource usage for the future time period for the second client;
based on the second predicted distribution of characteristics of resource usage for the future time period for the second client, simulating a second number of future predicted workloads for the future time period for the second client; and based on the second simulated number of the future predicted workloads for the future time period for the second client, automatically reserving a second set of resources for the future time period for the second client.

9. The device of claim 8, wherein:

the automatically reserving of the set of resources for the future time period for the client is further based on the simulated second number of the future predicted workloads for the future time period for the second client; and the automatically reserving of the second set of resources for the future time period for the second client is further based on the simulated second number of the future predicted workloads for the future time period for the client.

10. The device of claim 1, wherein:

the simulating of each predicted workload of the future predicted workloads for the future time period for the client further includes:

for each resource and each job, randomly generating the resource for the job based on a mean and a variance for the resource determined from the data for the plurality of previous time periods for the plurality of jobs of the client.

11. A computer-implemented method for requesting computing resources comprising:

accessing, with one or more processors, data for a plurality of previous time periods for a client of a plurality of clients, the data for each previous time period of the plurality of previous time periods including resource usage data for a plurality of jobs of the client;

applying, with the one or more processors, a time series analysis algorithm to the accessed data to predict a distribution of characteristics of resource usage for a future time period for the client;

based on the predicted distribution of characteristics of resource usage for the future time period for the client, simulating, with the one or more processors, a number of future predicted workloads for the future time period for the client, the simulating comprising:

generating a number of jobs expected to arrive in the future time period by selecting the number of jobs expected to arrive in the future time period from a normal distribution centered on a mean arrival rate; and generating simulated jobs for the future time period for the client based on the number of jobs expected to arrive in the future time period; and based on the simulated number of future predicted workloads for the future time period for the client, automatically reserving, with the one or more processors, a set of resources for the future time period for the client.

12. The method of claim 11, wherein the time series analysis algorithm is a vector auto-regression.

13. The method of claim 11, further comprising:

determining a target quality of service for the future time period for the client; and identifying the set of resources based on the target quality of service and a predetermined percentage of the simulated number of future predicted workloads.

14. The method of claim 13, wherein:

the jobs performed for the client are performed for a user of the client; and the target quality of service for the client is based on the user of the client.

15. The method of claim 11, further comprising:

accessing a fixed price cost for reserving the set of resources for the future time period; and accessing a spot price cost for reserving the set of resources for the future time period; and wherein the automatically reserving the set of resources for the future time period comprises reserving the set of resources using a lower cost of the fixed price cost and the spot price cost.

16. The method of claim 11, wherein the resource usage data for the plurality of jobs of the client comprises CPU usage, memory input/output (I/O) usage, disk I/O usage, and network usage.

17. The method of claim 11, further comprising:

accessing second data for the plurality of previous time periods for a second client of the plurality of clients, the second data for each previous time period of the plurality of previous time periods including resource usage data for a second plurality of jobs of the second client;

applying the time series analysis algorithm to the accessed second data to predict a second distribution of characteristics of resource usage for the future time period for the second client;

based on the second predicted distribution of characteristics of resource usage for the future time period for the second client, simulating a second number of future predicted workloads for the future time period for the second client; and based on the second simulated number of the future predicted workloads for the future time period for the second client, automatically reserving a second set of resources for the future time period for the second client.

18. The method of claim 17, wherein:

the automatically reserving of the set of resources for the future time period for the client is further based on the simulated second number of the future predicted workloads for the future time period for the second client; and the automatically reserving of the second set of resources for the future time period for the second client is further based on the simulated second number of the future predicted workloads for the future time period for the client.

19. A non-transitory computer-readable medium storing computer instructions for requesting computing resources, that when executed by one or more processors, cause the one or more processors to perform steps of:

accessing data for a plurality of previous time periods for a client of a plurality of clients, the data for each previous time period of the plurality of previous time periods including resource usage data for a plurality of jobs of the client;

applying a time series analysis algorithm to the accessed data to predict a distribution of characteristics of resource usage for a future time period for the client;

based on the predicted distribution of characteristics of resource usage for the future time period for the client, simulating a number of future predicted workloads for the future time period for the client, the simulating comprising:

generating a number of jobs expected to arrive in the future time period by selecting the number of jobs expected to arrive in the future time period from a normal distribution centered on a mean arrival rate; and generating simulated jobs for the future time period for the client based on the number of jobs expected to arrive in the future time period; and based on the simulated number of future predicted workloads for the future time period for the client, automatically reserving a set of resources for the future time period for the client.

* * * * *